C. V. KERR.
GEAR LUBRICATION.
APPLICATION FILED AUG. 23, 1913.
1,132,947.
Patented Mar. 23, 1915.
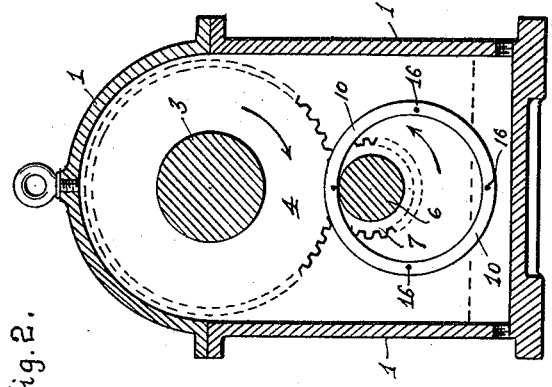
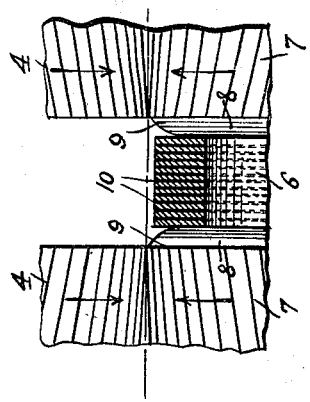
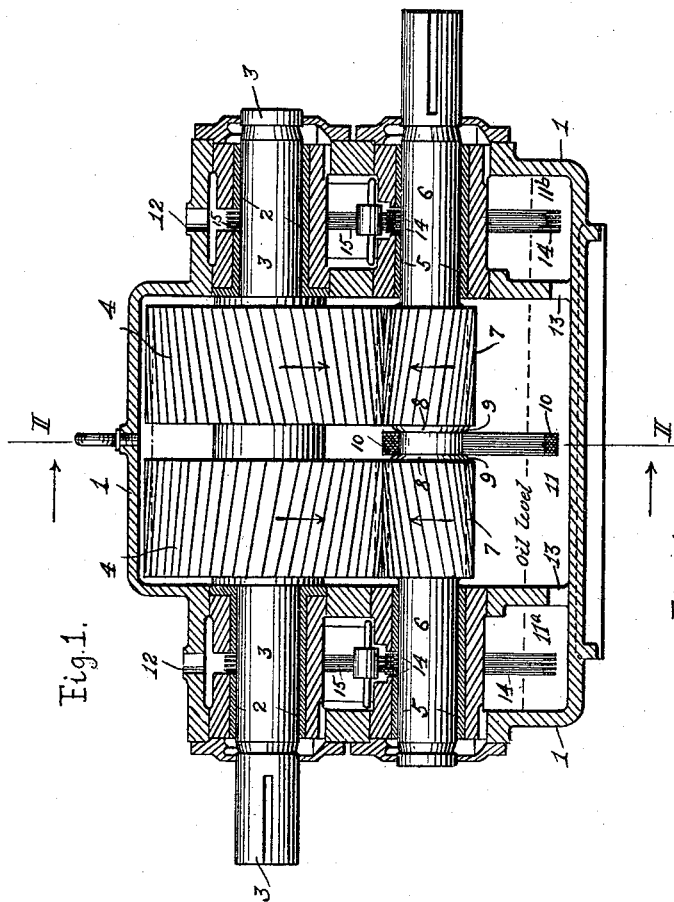
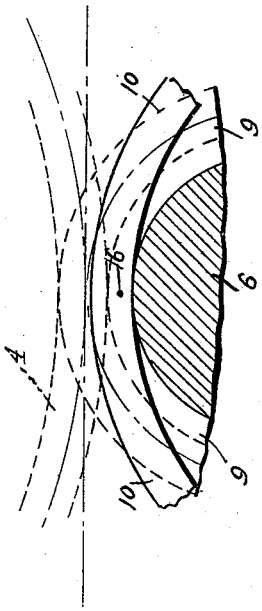
Witnesses
Inventor
Charles V. Kerr,
By
Attorneys

UNITED STATES PATENT OFFICE.

CHARLES VOLNEY KERR, OF WELLSVILLE, NEW YORK.

GEAR LUBRICATION.

1,132,947.  Specification of Letters Patent.  Patented Mar. 23, 1915.

Application filed August 23, 1913. Serial No. 786,266.

*To all whom it may concern:*

Be it known that I, CHARLES V. KERR, a citizen of the United States, residing at Wellsville, in the county of Allegany and State of New York, have invented certain new and useful Improvements in Gear Lubrication, of which the following is a specification.

My invention relates to improvements in gear lubrication, and is particularly adapted for lubrication of gears used to reduce the speed of a steam turbine, electric motor, or other high speed motive power, connected with a slower rotary speed blower, pump or other apparatus.

The object of the invention is to provide an efficient and automatic lubrication for the rapidly revolving gears, which will keep a constant circulation and a flow of the lubricant between the engaging surfaces of the teeth commensurate with the speed of the rapidly revolving gears.

The invention consists of structural features and relative arrangements of the elements which will be hereinafter more fully described and particularly pointed out in the appended claims.

In the drawings in which similar reference characters indicate the same parts in the several figures of the drawing: Figure 1 is a longitudinal section of a gear casing and bearings showing the invention applied thereto; Fig. 2 is a section on line II—II of Fig. 1; Fig. 3 is a fragmentary, enlarged section of Fig. 1 showing the relation of the lubricating rings to the gears; and Fig. 4 is a similar view of Fig. 2 showing the relation of the rings to the gears.

Referring to the drawings, 1 is any suitable gear casing which is provided with any approved form of upper bearings 2, 2 in which is supported a low speed or driven shaft 3, having keyed thereon separated gears 4, 4, said shaft 3 being connected by any approved means to a blower pump or similar apparatus, not shown. Lower bearings 5, 5, support a rapidly rotating shaft 6 which is connected to any form of high speed turbine or other motor, not shown, said shaft 6 carrying gears 7, 7, which mesh with the gears 4, 4, as shown. The gears 7, 7, are separated and are provided at the inner or adjacent sides with small projections or shoulders 8, having preferably convex and rounded edges 9, as shown in Fig. 3. In the space between the shoulders 8, 8, and supported by the shaft 6, between the gears 7, 7, are provided preferably, a series of independent flat lubricating rings 10, 10, whose lower sections dip into the oil contained in the reservoir 11, at the bottom of the gear casing 1. The lubricating rings 10 are stamped from sheet zinc or other non-corrosive metal and are spaced apart by small wires or projections 16 fixed to the side of the rings and parallel to the axis of the shaft 6. The ordinary oil ring may however be used. The teeth of gears 4, 4, and 7, 7, are so arranged that they are inclined forward on each side of the lubricating rings in the direction of rotation, as indicated by the arrows, for purposes to be hereinafter and presently described.

The top of the casing is provided with openings 12 for the purpose of introducing the lubricating oil into the casing to be deposited in the middle oil reservoir 11, said oil passing from the lateral reservoir 11$^a$ and 11$^b$, by means of the lower openings 13, into the middle reservoir 11. The openings 12 are also used for the purpose of observing the operation of lubricating the side bearings 2, 2.

The operation of the invention is as follows: The shaft 6 being rapidly revolved in the direction as indicated by the arrow by any suitable high speed motor, the lubricating rings 10 between the gears 7, 7, are rotated and the oil adhering to the bottom of the rings is carried up to the shaft 6 whence it is conveyed to the projections or shoulders 8, on the rapidly revolving gears 7, 7, and carried by centrifugal force up the inclined edges 9, 9, and conveyed and caught up by the teeth of the gear and spread sidewise on their working or engaging faces.

From the foregoing disclosure of construction and operation, it will be seen that oil can be easily, continuously and quickly conveyed from a reservoir to the teeth of meshing gears.

While I have shown a specific arrangement for simultaneously lubricating the superposed bearings 2, 2, and 5, 5, respectively, for the low speed shaft 3 and high speed shaft 6, by means of a set of lower lubricating rings 14 and a set of upper rings 15, the upper portions of said lower rings 14 intermeshing with the lower portion of said upper rings 15 at the upper side of the bearing 5, for the purpose of transferring a portion of the oil not used by said bearing 5, and adhering to the lower set of rings 14, to the upper set of rings 15, and relaying the same to the upper bearings 2, 2, whereby a lubricant can be conveyed from one reservoir 11ᵃ or 11ᵇ to two superposed bearings or shafts, as shown, I do not herein make claim to said matters of the invention, as these features are the subject-matter of a separate application, Serial No. 786,267, and filed by me on August 23, 1913.

What I claim is:—

1. A gear lubricator comprising a high speed rotary shaft, an upper low speed rotary shaft, a gear on said lower shaft, a gear on said upper shaft, said gears of the upper and lower shafts intermeshing with each other, an oil reservoir below said shafts, a lubricating ring surrounding and supported on the lower shaft adjacent to the side of the gear on said shaft, the lower section of said ring dipping into the oil reservoir, and an annular projection surrounding and rotating with the lower shaft and interposed between the side of the lubricating ring and the contiguous side of the lower gear and having an outer convex and round edge inclined upwardly from the lubricating ring to the side of the intermeshing gear teeth, whereby the oil adhering to the lubricating ring is transferred to said inclined edge of said annular projection and by centrifugal force thrown between the co-acting or working faces of the superposed rotary gears.

2. A gear lubricator comprising a lower high speed rotary shaft, an upper low speed rotary shaft, a gear on said lower shaft, a gear on said upper shaft, said gears of the upper and lower shafts intermeshing with each other, the teeth of said gears being inclined forwardly in the direction of rotation, an oil reservoir below said shafts, a lubricating ring consisting of a plurality of disks laterally adjacent each other and surrounding and supported on the lower shaft adjacent to the side of the gear on said shaft, the lower section of said disks dipping into the oil reservoir, means attached to said disks for separating them from each other, and an annular projection surrounding and rotating with the lower shaft and interposed between the side of the lubricating ring and the contiguous side of the lower gear having an outer convex and rounded edge inclined upwardly from the lubricating ring to the side of the intermeshing gear teeth, whereby the oil adhering to the lubricating ring is transferred to said inclined edge of said annular section and by centrifugal force thrown between the co-acting or working faces of the superposed rotary gears.

3. A gear lubricator comprising a lower high speed rotary shaft, an upper rotary shaft separated gears on said lower shaft, separated gears on said upper shaft, said gears of the lower and upper shafts intermeshing with each other, an oil reservoir below said shafts, a lubricating ring interposed between the separated lower gears and surrounding and supported from the lower shaft, an annular projection surrounding and rotating with the lower shaft and interposed on each side of said lubricating ring and between the adjacent sides of the lower gears, each of said annular projections having an outer convex and rounded edge inclined upwardly from the lubricating ring to the side of the adjacent intermeshing gear teeth, whereby the oil adhering to the lubricating ring is transferred to the inclined edge of each of the annular projections, and by centrifugal force thrown between the co-acting or working faces of the superposed rotary gears.

4. A gear lubricator comprising a lower high speed rotary shaft, an upper low speed rotary shaft, separated gears on said lower shaft, separated gears on said upper shaft, said gears of the lower and upper shafts intermeshing with each other, an oil reservoir below said shafts, a lubricating ring consisting of a plurality of disks laterally adjacent each other and interposed between the separated lower gears and surrounding and rotating with and supported from the lower shaft, a rotary annular section surrounding the lower shaft and interposed on each side of said lubricating ring and between the adjacent sides of the lower gears, each of said annular projections having an outer convex and rounded edge inclined upwardly from the lubricating ring to the side of the adjacent intermeshing gear teeth, whereby the oil adhering to the lubricating ring is transferred to the inclined edge of each of the annular projections, and by centrifugal force thrown between the co-acting or working faces of the superposed rotary gears.

In testimony whereof I affix my signature in presence of two witnesses.

CHARLES VOLNEY KERR.

Witnesses:
 VOLNEY A. KERR,
 ELIZABETH A. KERR.

Copies of this patent may be obtained for five cents each, by addressing the "Commissioner of Patents, Washington, D. C."